(12) United States Patent
Kanas

(10) Patent No.: US 11,112,676 B2
(45) Date of Patent: Sep. 7, 2021

(54) CAMERA LENS SLIDERS

(71) Applicant: HEWLETT-PACKARD DEVELOPMENT COMPANY, L.P., Spring, TX (US)

(72) Inventor: Derek Kanas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/763,482

(22) PCT Filed: Mar. 7, 2018

(86) PCT No.: PCT/US2018/021266
§ 371 (c)(1),
(2) Date: May 12, 2020

(87) PCT Pub. No.: WO2019/172898
PCT Pub. Date: Sep. 12, 2019

(65) Prior Publication Data
US 2021/0072618 A1    Mar. 11, 2021

(51) Int. Cl.
*G03B 9/36*   (2021.01)
*G03B 9/28*   (2021.01)
*G06F 1/16*   (2006.01)

(52) U.S. Cl.
CPC .............. *G03B 9/36* (2013.01); *G03B 9/28* (2013.01); *G06F 1/1686* (2013.01)

(58) Field of Classification Search
CPC ..................... H04M 1/0264; G03B 11/043
See application file for complete search history.

(56) References Cited

U.S. PATENT DOCUMENTS

| | | | | |
|---|---|---|---|---|
| 4,402,580 | A | * | 9/1983 | Ross ............... G02B 27/022 351/203 |
| 4,726,653 | A | * | 2/1988 | Thaler .............. G02B 30/34 359/467 |
| 5,534,961 | A | * | 7/1996 | Dowe ................ G03B 9/22 396/500 |
| 7,563,040 | B2 | | 7/2009 | Tsai et al. |
| 8,242,924 | B2 | | 8/2012 | Huang et al. |
| 8,537,271 | B2 | | 9/2013 | Tsai |
| 8,814,447 | B1 | | 8/2014 | Hambergen |
| 9,197,850 | B2 | | 11/2015 | Koberling |
| 9,465,276 | B2 | | 10/2016 | Jonsson et al. |
| 9,829,770 | B1 | | 11/2017 | Gustaveson, II |
| 9,848,169 | B2 | | 12/2017 | McNelley |
| 2009/0181729 | A1 | * | 7/2009 | Griffin, Jr. ......... H04N 5/2254 455/575.1 |

FOREIGN PATENT DOCUMENTS

| | | |
|---|---|---|
| CN | 204143141 U | 2/2015 |
| JP | H0450562 B2 | 8/1992 |
| JP | 2008139459 A | 6/2008 |
| JP | 2010210936 A | 9/2010 |

* cited by examiner

*Primary Examiner* — Noam Reisner
(74) *Attorney, Agent, or Firm* — HPI Patent Department

(57) ABSTRACT

Examples disclosed herein provide a shutter for obscuring a viewing portion of an opening found on a housing of a computing device. As an example, the housing includes a bezel that includes the opening extending through the bezel. The housing includes a slider deployable from within the housing, and the shutter is to selectively obscure the viewing portion when the slider is to deploy from within the housing.

12 Claims, 4 Drawing Sheets

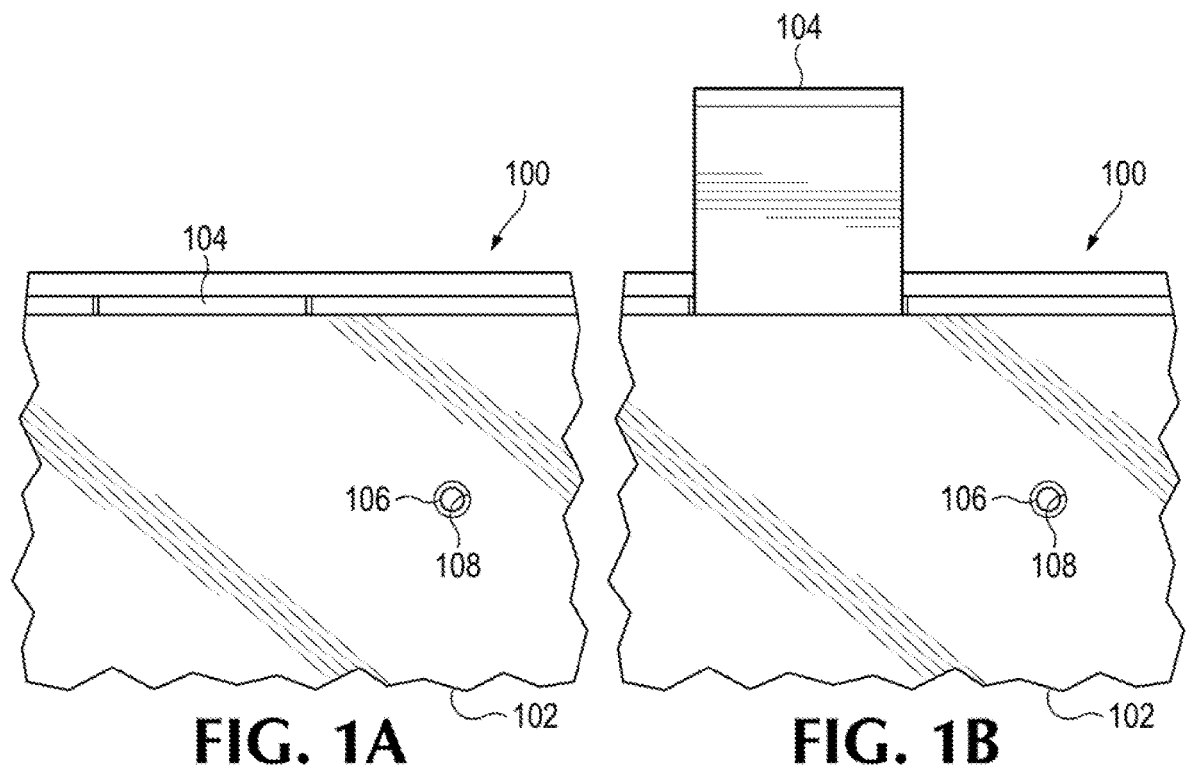
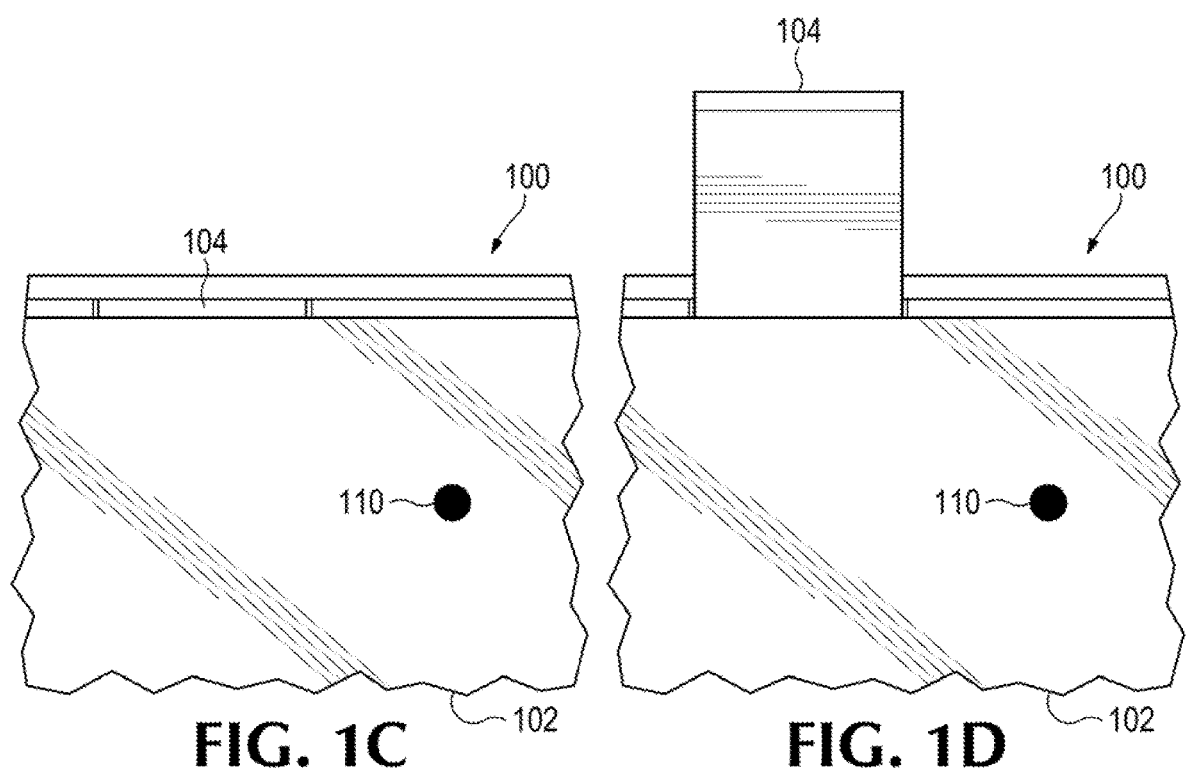

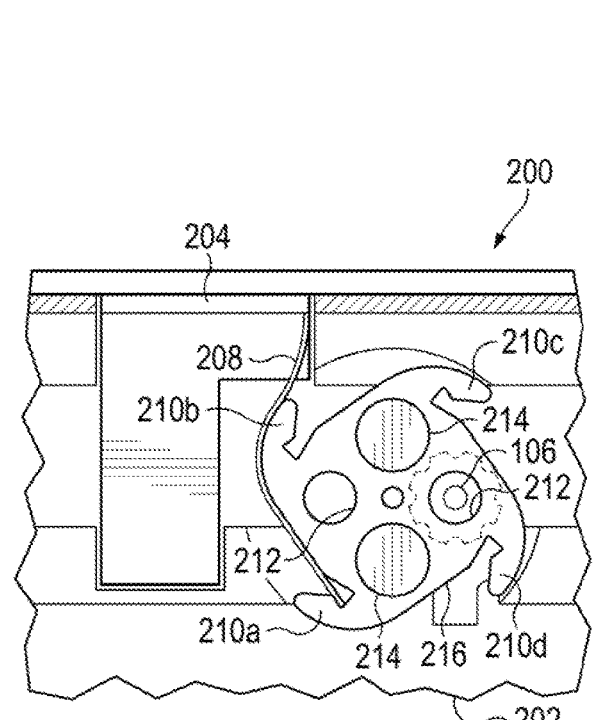 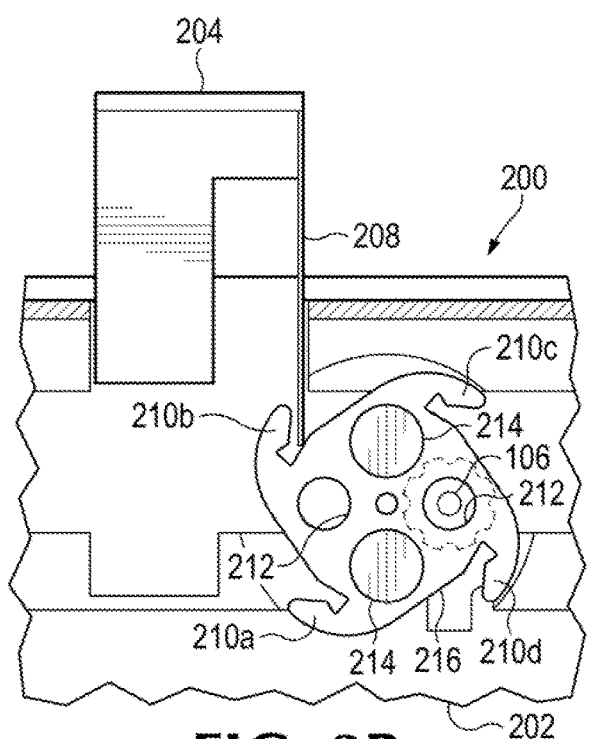
FIG. 2A  FIG. 2B
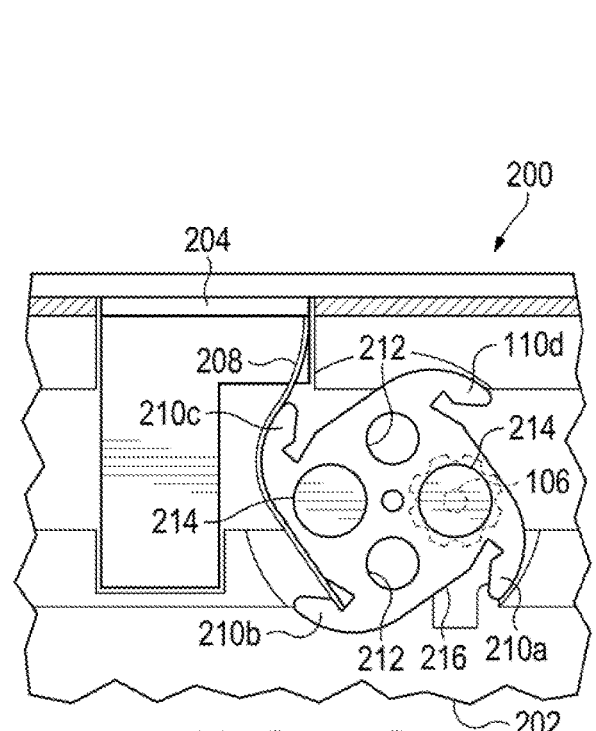 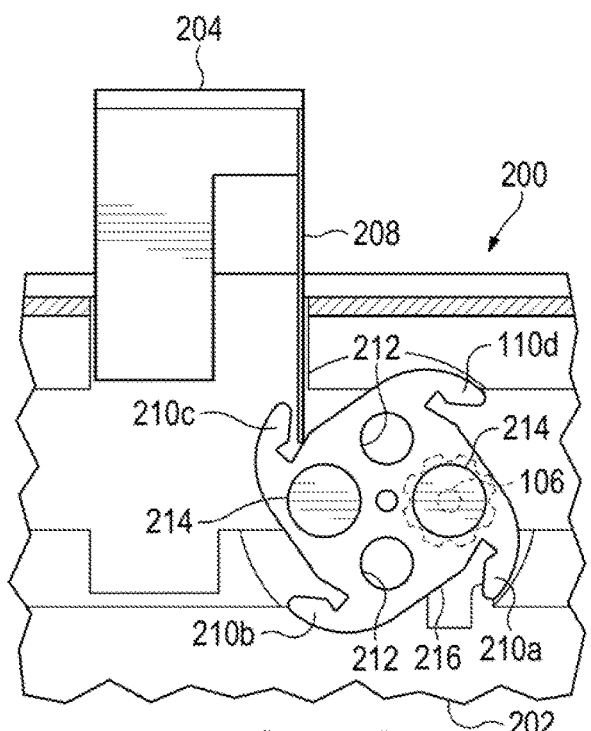
FIG. 2C  FIG. 2D

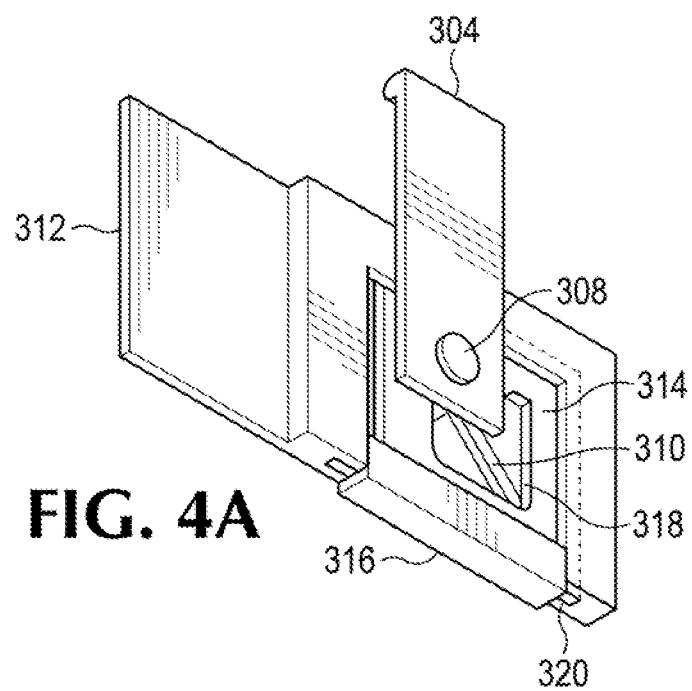
FIG. 4A
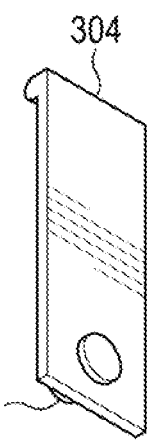
FIG.4B
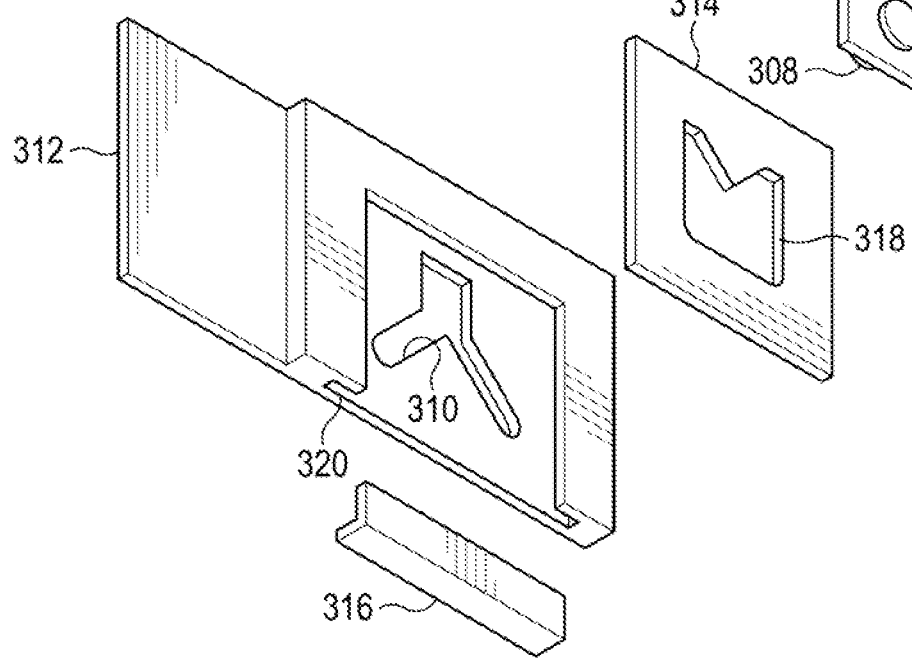

CAMERA LENS SLIDERS

BACKGROUND

Computing devices, such as laptop computers, desktop computers, and smartphones, may include a camera (e.g., webcam). The camera may capture electronic images such as photos and/or video images. The camera may capture the electronic images responsive to an input such as an input provided by a user and/or an application, among other possibilities. The cameras may be located on an external surface of the computing device, in order to promote capture of the electronic images.

BRIEF DESCRIPTION OF THE DRAWINGS

FIGS. 1A-D illustrate a computing device including a housing with a shutter to provide privacy measures to users of the computing device, according to an example;

FIGS. 2A-D illustrate a computing device including a shutter with alternating elements to selectively obscure the lens of the camera, according to an example;

FIGS. 4A-B illustrate a rear view of the mechanism illustrated in FIGS. 3A-D that traverses the shutter laterally between exposing and obscuring the lens, according to an example.

DETAILED DESCRIPTION

Figure 3A:
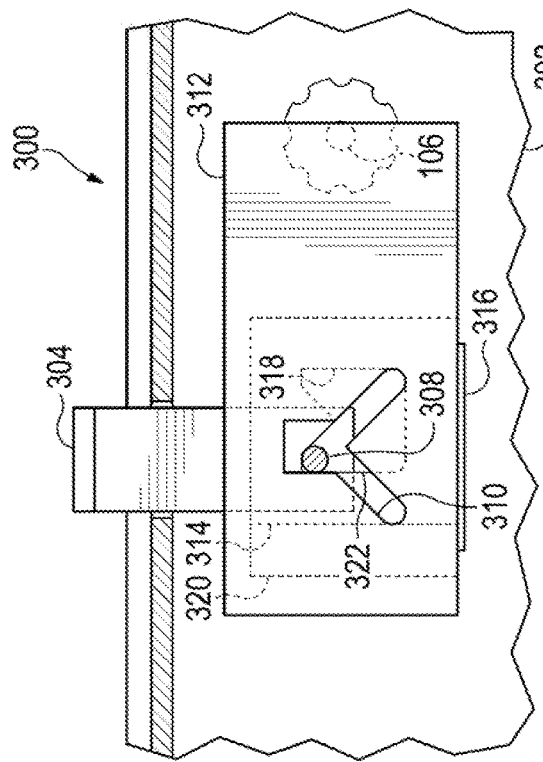
FIGS. 3A-D illustrate a computing device including a shutter that moves laterally between obscuring and exposing the lens of the camera, according to an example.

Privacy is a concern for users of such computing, devices including, cameras. For instance, control may be gained of a camera in a computing device for a variety of undesired reasons. For instance, control may be acquired of the camera included in the computing device and/or access may be gained to electronic images captured by the camera, unbeknownst to a user of the computing device. In some approaches, this may be possible because the camera may be visible and accessible to the user at all times during operation of the computing device. For example, in some approaches the camera may be mounted on an exterior portion of the computing device (e.g., on a display of the computing device), where it may be visible and accessible to the user during operation of the computing device.

Examples disclosed herein provide a cover for obscuring an opening found on the computing device, such as for a lens of the camera, according to an example. By having the ability to physically obscure the opening via the cover, rather than via software or electronically, the user of the computing device has physical assurance that the opening for the camera lens is covered, addressing the privacy concerns described above. For example, even if the webcam is hacked, where images can be captured without knowledge of the user, using the cover to physically obscure or shutter the opening where the webcam is located may prevent such capture from occurring.

With reference to the figures, FIGS. 1A-D illustrate a computing device 100 including a housing 102 with a shutter 110 to provide privacy measures to users of the computing device 100, according to an example. As an example of the privacy measures provided by the shutter 110, the shutter 110 may selectively obscure a lens 106 of a camera of the computing device 100 via deployment of a slider 104. Referring to FIG. 1, the lens 106 may be exposed through an opening 108 extending, for example, through a bezel of the housing 102, and the shutter 110, may be disposed within the housing 102, in between the opening 108 and lens 106. In order to reduce or prevent any z thickness impact, the shutter 110 may be made from a thin sheet metal, as an example.

When the user desires to switch between the shutter 110 exposing and obscuring the lens 106 of the camera, the user may deploy the slider 104 from within the housing 102, as will be further described. As a result, rather than relying on software or electronics to ensure privacy measures, which can be hacked, the user can rely on the physical protection provided by the shutter 110 to ensure privacy from prying ears or eyes. Moreover, the shutter 110 may provide visual feedback to the user to ensure that the lens 106 is blocked. As an example, the color of the shutter 110 may be red, in order to provide a clear indication when the lens 106 is blocked by the shutter 110.

As illustrated, the housing 102 of the computing device 100 includes a slider 104 deployable from within the housing 102. When the slider 104 is retracted within the housing 102, as illustrated in FIG. 1A, the slider 104 integrates with the bezel of the housing 102, except for two parting lines to the bezel. By integrating with the bezel, the mechanical switch offered by the slider 104 is hidden from view when retracted. Referring to FIG. 1A, the lens 106 of the camera is exposed through a dewing portion of the opening 108, ready for use. However, in a first instance, when the user desires to block the lens 106, the user extends the slider 104 from within the housing 102, as illustrated in FIG. 1B.

Upon extending from within the housing 102, the user pushes the slider 104 to retract back within the housing 102 to its original position, as illustrated in FIG. 1C. As an example, rather than the user pushing the slider 104 back within the housing 102, the slider 104 may be spring-loaded and automatically retract back within the housing 102. Upon retraction, the shutter 110 obscures the viewing portion of the opening 108, blocking the lens 106. Similarly, in a second instance subsequent to the first instance, when the user desires to use the camera, for example, for video conferencing, the user extends the slider 104 from within the housing 102, as illustrated in FIG. 1D. Upon extending from within the housing 102, the user pushes the slider 104 to retract back within the housing 102 to its original position (or the slider 104 automatically retracts). Referring back to FIG. 1A, upon retraction, the shutter 110 is removed from the viewing portion of the opening 108, exposing the lens 106 for use. The mechanism for exposing and obscuring the lens 106 via the shutter 110 may vary, as will be further described.

FIGS. 2A-D illustrate a computing device 200 including a shutter 216 with alternating elements to selectively obscure the lens 106 of the camera, according to an example. The bezel of a housing 202 of the computing device 200 is removed in order to expose the mechanism that rotates the shutter 216 between exposing and obscuring the lens 106 of the camera. As a result, an opening extending through a bezel of housing 202 may accommodate the lens 106, similar to opening 108 of FIGS. 1A-D, with shutter 216 disposed in between the housing 202 and the lens 106. As will be further described, when slider 204 is extended from and retracted back within the housing 202 of the computing device 200, a flexible element 208 coupled to the slider 204 rotates the shutter 216, alternating between exposing and obscuring the lens 106 from view.

As illustrated, shutter 216 includes a first set of elements 214 used for obscuring lens 106 from view and a second set of elements 212 for exposing the lens 106 for view through the opening of housing 202. As shutter 216 is rotated by the flexible element 208, each time slider 204 is deployed (e.g., extended from and retracted back within the housing 202), the shutter 216 alternates between obscuring and exposing the lens 106 via the first set of elements 214 and second set of elements 212, respectively. As an example, the shutter 216 includes teeth 210a-210d around a circumference of the shutter 216 to mate with the flexible element 208 as the slider 204 is deployed from within the housing 202. The number of teeth around the circumference of the shutter 216 may vary from what is illustrated. In addition, the number of teeth around the circumference of the shutter 216 may correspond to the number of alternating elements between the first set of elements 214 and second set of elements 212 (e.g., four to four, as illustrated).

Similar to slider 104 of FIGS. 1A-D, the housing 202 of computing device 200 includes a slider 204 deployable from within the housing 202. When the slider 204 is retracted within the housing 202, as illustrated in FIG. 2A, the slider 204 integrates with the bezel of the housing 202, except for two parting lines to the bezel. Referring to FIG. 2A, the lens 106 of the camera is exposed through an element from the second set of elements 212, ready for use. However, in a first instance, when the user desires to block the lens 106, the user first extends the slider 204 from within the housing 202, as illustrated in FIG. 28. Referring to the flexible element 208 coupled to the slider 204, the flexible element 208 may be a spring-like substance that returns to its original shape when the slider 204 is extended from within the housing 202, and at the same time, the flexible element 208 may catch onto or mate with the next teeth around the circumference of the shutter 216 (e.g., from teeth 210a to teeth 210b in FIG. 2B). Upon extending from within the housing 202, the user next pushes the slider 204 to retract back within the housing 202 to its original position, as illustrated in FIG. 2C. As mentioned above, rather than the user pushing the slider 204 back within the housing 202, the slider 204 may be spring-loaded and automatically retract back within the housing 202. As illustrated, the flexible element 208 bends to take the shape of the shutter 216 while rotating the shutter 216, for example, a quarter turn, to obscure the lens 106 by an element from the first set of elements 214.

Similarly, in a second instance subsequent to the first instance, when the user desires to use the camera, for example, for video conferencing, the user extends the slider 204 from within the housing 202, as illustrated in FIG. 2D. As illustrated, the flexible element 208 may catch onto or mate with teeth 210c, above teeth 210b. Upon extending from within the housing 20Z the user next pushes the slider 204 to retract back within the housing 202 to its original position (or the slider 204 automatically retracts). As described above, the flexible element 208 bends to take the shape of the shutter 216 while rotating the shutter 216, for example, another quarter turn, to now expose the lens 106 by an element from the second set of elements 212. As a result, each time the slider 204 is extended from and retracted back within the housing 202, the shutter 216 alternates between obscuring and exposing the lens 106 via the first set of elements 214 and second set of elements 212, respectively.

FIGS. 3A-D illustrate a computing device 300 including a shutter 312 that moves laterally between obscuring and exposing the lens 106 of the camera, according to an example. The bezel of a housing 302 of the computing device 200 is removed in order to expose the mechanism that moves the shutter laterally. As a result, an opening extending through a bezel of housing 302 may accommodate the lens 106, similar to opening 108 of FIGS. 1A-D, with shutter 312 disposed in between the housing 302 and the lens 106. As will be further described, when slider 304 is extended from and retracted back within the housing 302 of the computing device 300, a pin 308 of slider 304 traverses a path 310 along the shutter 312, alternating between exposing and obscuring the lens 106 from view.

Figure 3B:
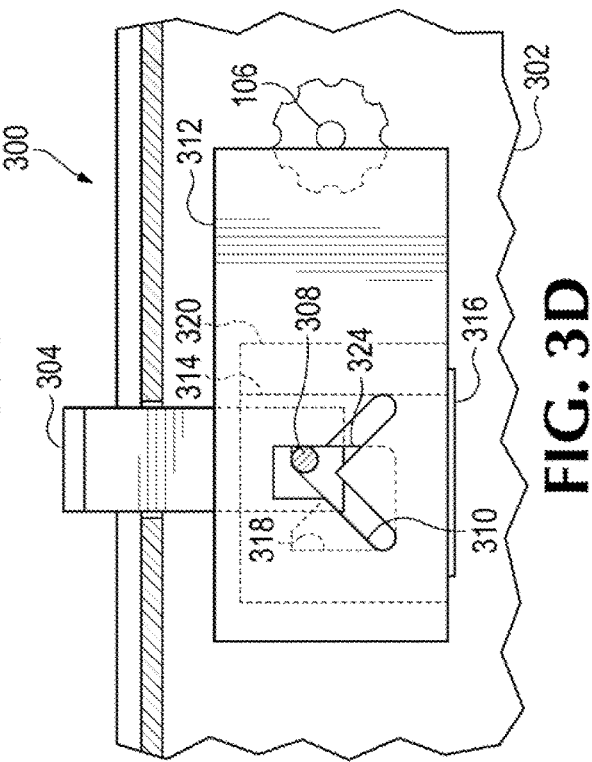

Similar to slider 104 of FIGS. 1A-D, the housing 302 of computing device 300 includes a slider 304 deployable from within the housing 302. When the slider 304 is retracted within the housing 302, as illustrated in FIG. 3A, the slider 304 integrates with the bezel of the housing 302, except for two parting lines to the bezel. Referring to FIG. 3A, the shutter 312 exposes the lens 106 of the camera, ready for use. However, in a first instance, when the user desires to block the lens 106, the user first extends the slider 304 from within the housing 302, as illustrated in FIG. 3B. As illustrated, the pin 308 of slider 304 is inserted into a slot on the shutter 312, which follows path 310. When the slider 304 is extended, as illustrated in FIG. 3B, the pin 308 moves the shutter 312 half way between open position illustrated in FIG. 3A and the closed position illustrated in FIG. 3.

Figure 3C:
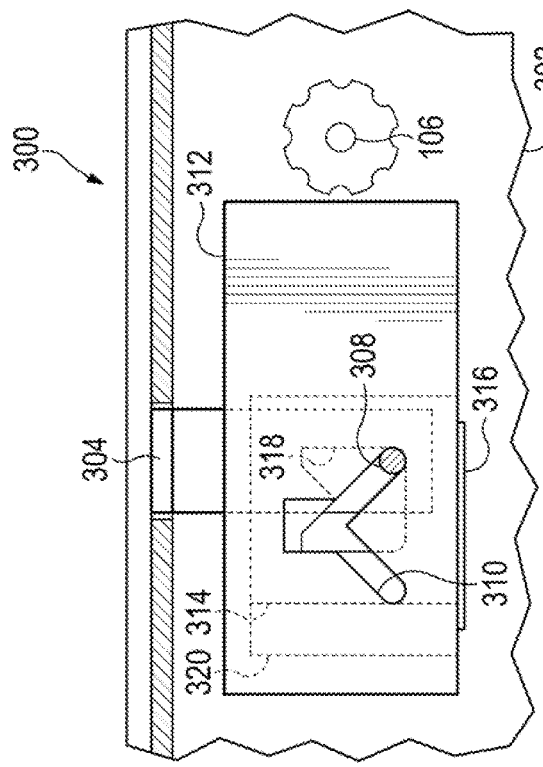

Upon extending from within the housing 302, the user next pushes the slider 304 to retract back within the housing 302 to its original position, as illustrated in FIG. 3C. As mentioned above, rather than the user pushing the slider 304 back within the housing 302, the slider 304 may be spring-loaded and automatically retract back in the housing 302. When the slider 304 retracts back into the housing 302, the pin 308 of the slider 304 completes the remainder of the path 310 along the shutter 312, in order to obscure the lens 106. However, in order to ensure that the pin 308 completes the remainder of the path 310 and, for example, does not revert back to the position illustrated in FIG. 3A, additional mechanisms may be utilized. For example, a spring mechanism (not shown) may be utilized in order to ensure that the pin 308 traverses the full length of the path 310.

Referring to FIGS. 3A-D, as the pin 308 traverses the path 310 along the shutter 312, a guide plate 314 disposed behind the shutter 312 may ensure that the pin 308 travels the full length of the path 310 when the slider 304 is deployed. For example, referring back to FIG. 3B, when the slider 304 is extended, the shutter 312 and guide plate 314 slide or traverse together. As an example, the shutter 312 and guide plate 314 are assembled together with an interference fit 316, in order to ensure that the shutter 312 and guide plate 314 are able to slide together. Once the slider 304 is fully extended, as illustrated in FIG. 3B, the guide plate 314 ensures that the pin 308 reaches the left side of the tip of path 310, providing the ability for pin 308 to complete traveling the full length of path 310 and not revert back to the position illustrated in FIG. 3A. As the slider 304 is retracted back within the housing 302, the pin 308 makes contact with a cutout 318 within the guide plate 314 at 322. Upon making contact with the guide plate 314 at 322, the pin 308 continues to move the shutter 312 to the right, but holds the guide plate 314 in place, until the pin 308 completes the length of the path 310, as illustrated in FIG. 3C, obscuring the lens 106. As illustrated, the shutter 312 provides a clearance 320 to allow for the guide plate 314 and shutter 312 to move independently when contact is made at 322.

Figure 3D:
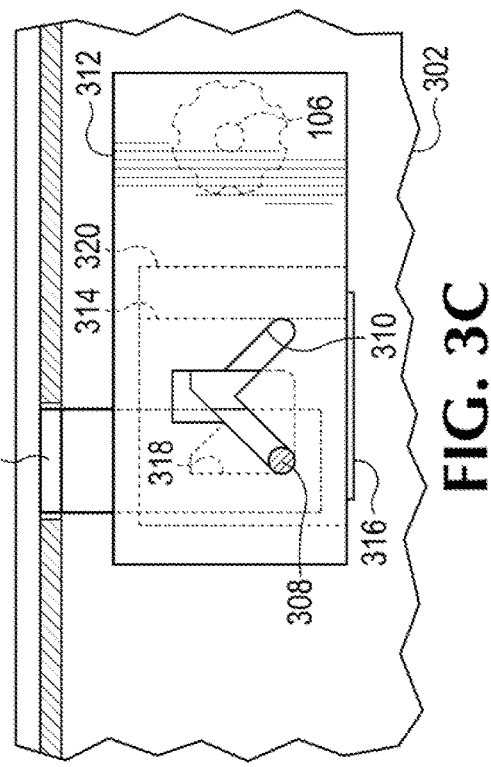

Similarly, in a second instance subsequent to the first instance, when the user desires to use the camera, for example, for video conferencing, the user extends the slider 304 from within the housing 302, as illustrated in FIG. 3D. For example, when the slider 304 is extended, the pin 308 moves the shutter 312 half way between closed position illustrated in FIG. 3C and the open position illustrated in FIG. 3A. As described above, the shutter 312 and guide plate 314 slide or traverse together, due to the interference fit.

Once the slider 304 is fully extended, as illustrated in FIG. 3D, the guide plate 314 ensures that the pin 308 reaches the right side of the tip of path 310, providing the ability for pin 308 to complete traveling the full length of path 310 and not revert back to the position illustrated in FIG. 3C. As the slider 304 is retracted back within the housing 302, the pin 308 makes contact with a cutout 318 within the guide plate 314 at 324. Upon making contact with the guide plate 314 at 324, the pin 308 continues to move the shutter 312 to the left, but holds the guide plate 314 in place, until the pin 308 completes the length of the path 310, as illustrated in FIG. 3A, exposing the lens 106 for use. As a result, each time the slider 304 is extended fray and retracted back within the housing 302, the shutter 312 moves laterally to alternate between obscuring and exposing the lens 106.

FIGS. 4A-B illustrate a rear view of the mechanism illustrated in FIGS. 3A-D that traverses the shutter 312 laterally between exposing and obscuring the lens, according to an example. As illustrated, the guide plate 314 is disposed behind the shutter 312 in a cutout that provides clearance 320 for the guide plate 314 to move independently from the shutter 312, for example, when pin 308 of slider 304 makes contact with cutout 318 of the guide plate 314, as the slider 304 is extended and retracted.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed:

1. A computing device comprising:
a camera comprising a lens; and
a housing comprising:
an opening extending through the housing, wherein the opening is to accommodate the lens;
a slider deployable from within the housing;
a shutter to selectively obscure a viewing portion of the opening; and
an element coupled to the slider that is to engage with the shutter, wherein the element is to bend to take the shape of an outer edge of the shutter, and wherein when the slider is to deploy from within the housing in a first instance, the shutter is to obscure the viewing portion, and wherein when the slider is to deploy from within the housing in a second instance subsequent to the first instance, the shutter is to expose the viewing portion.

2. The computing device of claim 1, wherein the slider to deploy from within the housing comprises:
the slider to extend from within the housing; and
upon extending from within the housing, the slider to retract back within the housing.

3. The computing device of claim 2, wherein the shutter comprises:
alternating elements to selectively obscure the viewing portion;
teeth defined along the outer edge of the shutter to mate with the element as the slider is to deploy from within the housing.

4. The computing device of claim 3, wherein:
when the slider is to extend from within the housing in the first instance, the element is to engage with a first tooth defined along the outer edge of the shutter, and
when the slider is to retract back within the housing upon extending from within the housing in the first instance, the element is to rotate the shutter, wherein a first element of the alternating elements is to obscure the viewing portion.

5. The computing device of claim 4, wherein:
when the slider is to extend from within the housing in the second instance, the element is to mate with a second tooth around the circumference of the shutter disposed above the first tooth, and
when the slider is to retract back within the housing upon extending from within the housing in the second instance, the element is to rotate the shutter, wherein a second element of the alternating elements is to expose the viewing portion.

6. The computing device of claim 4, wherein the element is to rotate the shutter a quarter turn each time the slider is to deploy from within the housing.

7. A computing device comprising:
a camera comprising a lens; and
a housing comprising:
a bezel comprising an opening extending through the bezel, wherein the opening is to accommodate the lens;
a slider deployable from within the housing;
a shutter to selectively obscure a viewing portion of the opening; and
an element coupled to the slider that is to bend to conform along an outer edge of the shutter;
wherein when the slider is to deploy from within the housing in a first instance, the shutter is to obscure the viewing portion.

8. The computing device of claim 7, wherein when the slider is to deploy from within the housing in a second instance subsequent to the first instance, the shutter is to expose the viewing portion.

9. The computing device of claim 7, wherein the slider to deploy from within the housing comprises:
the slider to extend from within the housing; and
upon extending from within the housing, the slider to retract back within the housing.

10. The computing device of claim 7, wherein the shutter comprises:
alternating elements to selectively obscure the viewing portion; and teeth around the outer edge of the shutter to mate with the element as the slider is to deploy from within the housing.

11. A computing device comprising:
a camera comprising a lens; and
a housing comprising:
  an opening extending through the housing, wherein the opening is to accommodate the lens;
  a slider deployable from within the housing;
  a shutter rotatably positioned within the housing; and
  an element coupled to the slider,
  wherein extending the slider from the housing is to slide the element along an outer edge of the shutter such that the element bends to conform with the outer edge, and
  wherein retracting the slider into the housing after the extending is to engage the element with a tooth on the shutter to rotate the shutter and obscure the lens.

12. The computing device of claim 11, wherein the slider is biased into the housing.

\* \* \* \* \*